United States Patent
Lee et al.

(10) Patent No.: US 11,772,197 B2
(45) Date of Patent: Oct. 3, 2023

(54) LASER TRANSMISSION CHARACTERISTIC VALUE DETERMINATION METHOD

(71) Applicant: LG CHEM, LTD., Seoul (KR)

(72) Inventors: Young Kyu Lee, Cheongju-Si (KR); Sang Jin Kim, Cheongju-Si (KR); Young Su Son, Cheongju-Si (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 724 days.

(21) Appl. No.: 16/490,001

(22) PCT Filed: Sep. 18, 2018

(86) PCT No.: PCT/KR2018/010996
§ 371 (c)(1),
(2) Date: Aug. 29, 2019

(87) PCT Pub. No.: WO2019/059617
PCT Pub. Date: Mar. 28, 2019

(65) Prior Publication Data
US 2019/0389006 A1 Dec. 26, 2019

(30) Foreign Application Priority Data
Sep. 22, 2017 (KR) .......................... 10-2017-0122728

(51) Int. Cl.
*B23K 26/359* (2014.01)
*B23K 26/03* (2006.01)
(Continued)

(52) U.S. Cl.
CPC ............ *B23K 26/359* (2015.10); *B23K 26/03* (2013.01); *B23K 26/048* (2013.01);
(Continued)

(58) Field of Classification Search
CPC ............ B23K 2101/36; B23K 2103/42; B23K 26/00; B23K 26/02; B23K 26/03;
(Continued)

(56) References Cited

U.S. PATENT DOCUMENTS 6,066,829 A * 5/2000 Ishikawa .................. B41J 2/471
347/225
6,858,815 B1 * 2/2005 Costin .................. D06P 5/2011
219/121.85
(Continued)

FOREIGN PATENT DOCUMENTS

CN 1956850 A 5/2007
CN 102574408 A 7/2012
(Continued)

OTHER PUBLICATIONS

Extended European Search Report dated Apr. 15, 2020 for European Patent Application No. 18859066.5.
(Continued)

*Primary Examiner* — Sang Y Paik
(74) *Attorney, Agent, or Firm* — Birch, Stewart, Kolasch & Birch, LLP

(57) ABSTRACT

A laser transmission characteristic value determination method for determining an appropriate transmission characteristic value of a laser so that a marked letter becomes a predetermined font size or more when marking a letter on a surface of a heat shrinkable tube formed on the outer periphery of a battery cell.

14 Claims, 3 Drawing Sheets

(51) Int. Cl.
  *B23K 26/04*    (2014.01)
  *B23K 26/08*    (2014.01)
  *H01M 50/107*   (2021.01)
  *H01M 50/124*   (2021.01)
  *B23K 101/36*   (2006.01)
  *H01M 50/133*   (2021.01)

(52) U.S. Cl.
  CPC ....... *B23K 26/0876* (2013.01); *H01M 50/107* (2021.01); *H01M 50/124* (2021.01); *B23K 2101/36* (2018.08); *H01M 50/133* (2021.01)

(58) Field of Classification Search
  CPC .............. B23K 26/048; B23K 26/0876; B23K 26/352; B23K 26/359; H01M 50/107; H01M 50/116; H01M 50/124; H01M 50/133; Y02E 60/10
  USPC ................... 429/163–184; 219/121.6–121.83
  See application file for complete search history.

(56) References Cited

U.S. PATENT DOCUMENTS

| | | | | |
|---|---|---|---|---|
| 2008/0050651 | A1* | 2/2008 | Wakai | B32B 27/08 429/185 |
| 2008/0171160 | A1* | 7/2008 | Nishikawa | C08L 23/0876 428/34.9 |
| 2010/0047673 | A1* | 2/2010 | Hirakawa | H01M 50/289 429/57 |
| 2015/0179990 | A1* | 6/2015 | Utley | H01M 50/20 429/120 |
| 2016/0158885 | A1 | 6/2016 | Dallarosa et al. | |

FOREIGN PATENT DOCUMENTS

| | | | |
|---|---|---|---|
| CN | 104002576 | A | 8/2014 |
| CN | 205525730 | U | 8/2016 |
| CN | 106275670 | A | 1/2017 |
| DE | 10 2015 006 837 | A1 | 12/2016 |
| JP | 4-101409 | A | 4/1992 |
| JP | 4-349341 | A | 12/1992 |
| JP | 8-276506 | A | 10/1996 |
| JP | 11-91250 | A | 4/1999 |
| JP | 2000-114619 | A | 4/2000 |
| JP | 2003-303523 | A | 10/2003 |
| JP | 2008-165095 | A | 7/2008 |
| JP | 2010-23295 | A | 2/2010 |
| JP | 2011-204913 | A | 10/2011 |
| JP | 2013-43430 | A | 3/2013 |
| JP | 2014-514164 | A | 6/2014 |
| KR | 10-0670473 | B1 | 1/2007 |
| KR | 10-2009-0008068 | A | 1/2009 |
| KR | 10-2010-0048773 | A | 5/2010 |
| KR | 10-1313646 | B1 | 10/2013 |
| KR | 10-1607842 | B1 | 3/2016 |
| WO | WO 2008/137233 | A1 | 11/2008 |

OTHER PUBLICATIONS

International Search Report for PCTIKR2018/010996 dated Dec. 24, 2018.
Jing Feng QiAO, "Preparation and Marking Laser Marking Process of Fire-Retardant PBT", Mar. 15, 2017 Chinese outstanding mater dissertations full-text database, Engineering Technology, Part I, pp. 1-13.
European Communication pursuant to Article 94(3) EPC for European Patent Application No. 18 859 066.5, dated Feb. 24, 2023.

* cited by examiner

[Fig.1]
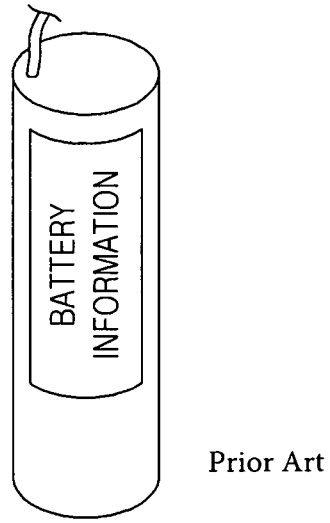
Prior Art
[Fig.2]
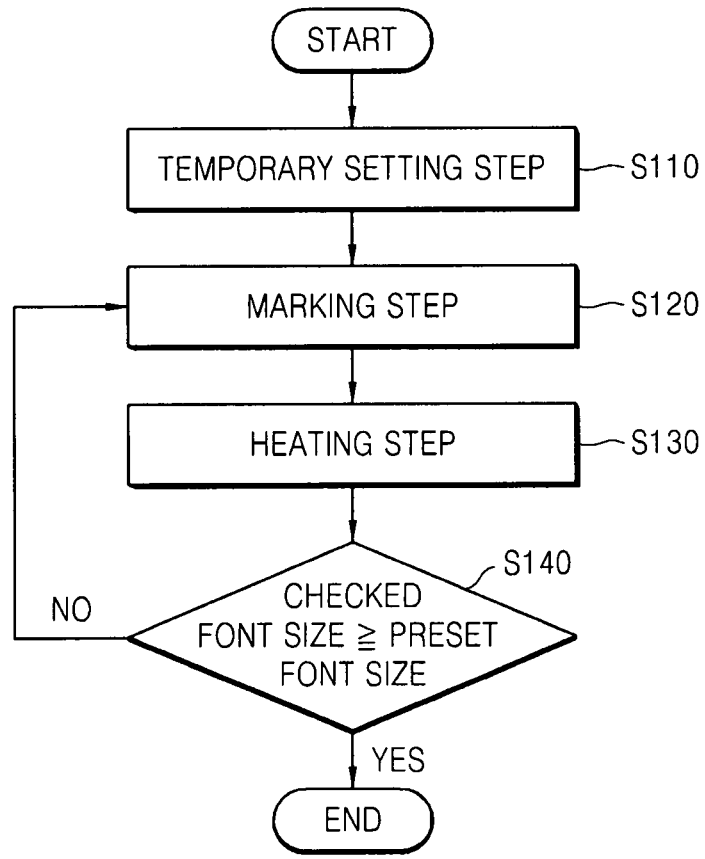

[Fig. 3]
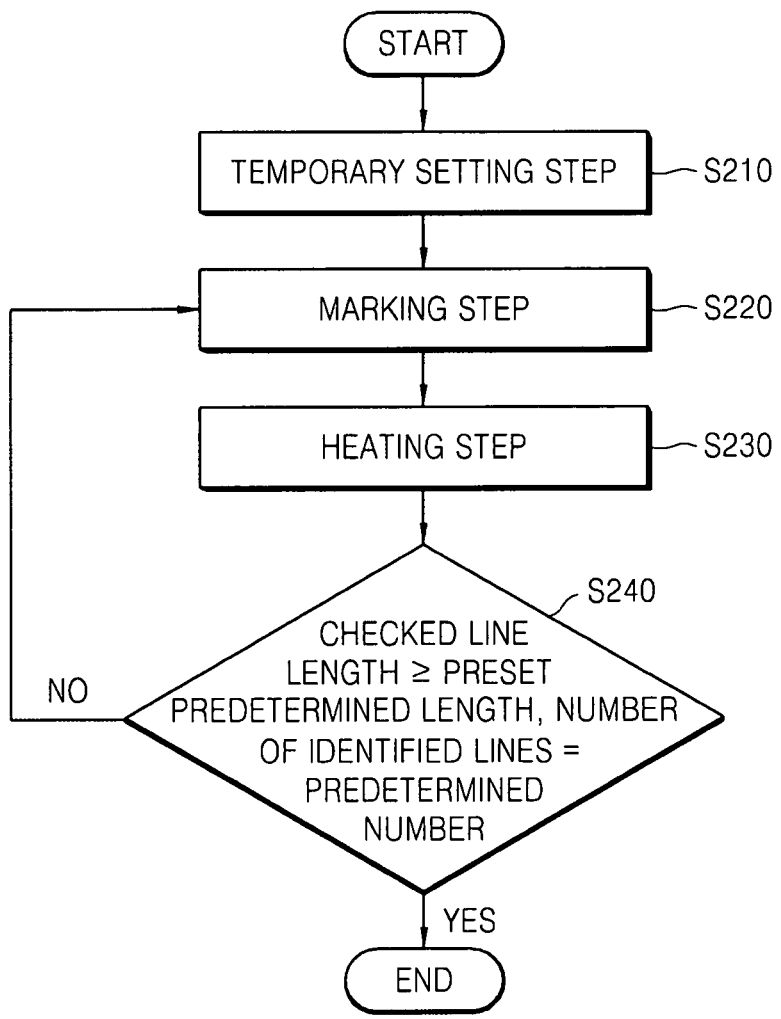

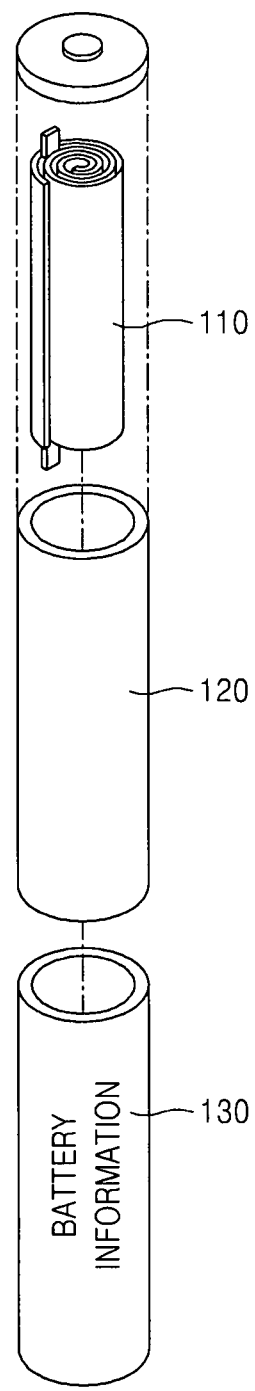

LASER TRANSMISSION CHARACTERISTIC VALUE DETERMINATION METHOD

TECHNICAL FIELD

The present invention relates to a laser transmission characteristic value determination method, and more particularly, relates to a laser transmission characteristic value determination method for determining an appropriate transmission characteristic value of a laser so that a marked letter becomes a predetermined font size or more when marking a letter on a surface of a heat shrinkable tube formed on the outer periphery of a battery cell.

BACKGROUND ART

The lithium secondary battery as a unit cell constituting the battery pack has flexibility, so that its shape is relatively free, its weight is light and its safety is excellent. Therefore, lithium secondary batteries are increasingly in demand for portable electronic devices such as mobile phones, camcorders and notebook computers.

Also, the shape of the battery pack is divided according to the shape of the battery case. If the electrode assembly is embedded in a cylindrical or rectangular metal can, the shape of the battery pack is classified into a cylindrical battery pack and a prismatic battery pack. Also, when the electrode assembly is embedded in a pouch-shaped case of an aluminum laminate sheet, it is classified as a pouch type battery pack.

Also, the electrode assembly included in the battery case is composed of an anode, a cathode, and a separator structure inserted between the anode and the cathode, and is chargeable/dischargeable. Also, the shape of the cylindrical electrode assembly is formed into a jelly-roll type in which a long sheet-like anode coated with an electrode active material, a separator and a cathode are sequentially stacked and wound.

Meanwhile, in general, in order to express the certification logo of each country and the caution statement of the product, a separate PET label is attached to the battery cell, and such a conventional battery cell will be described with reference to FIG. 1.

FIG. 1 is a structural view of a conventional battery cell.

Referring to FIG. 1, a conventional battery cell further includes a heat shrinkable tube for fixing the case and a label so that it may be insulated from the outside.

However, since the label does not have a function other than the letter delivery of the corresponding battery cell, unnecessary material costs are added.

Therefore, it is required to develop a technology which may delete the unnecessary configuration while the product information of the battery cell is written.

PRIOR ART DOCUMENT

Patent Literature (Patent Document 1) JP2008-165095 A

DISCLOSURE OF THE INVENTION

Technical Problem

The present invention provides a laser transmission characteristic value determination method for determining an appropriate laser transmission characteristic value so that the label, which is an unnecessary configuration, is deleted and the letter of the battery cell, instead of a label, may be written in a heat shrinkable tube.

Technical Solution

In accordance with an exemplary embodiment, provided is a transmission characteristic value determination method of a laser marking a battery cell whose outer surface is formed of a heat shrinkable tube, the method including: a temporary setting step of setting a frequency, a marking speed, and a focal distance of a laser to a predetermined temporary setting value; marking a letter on the heat shrinkable tube by transmitting the laser using a temporary setting value set in the temporary setting step; a heating step of applying heat to the heat shrinkable tube; and a font size checking step of determining, after the heating step, whether a font size of the letter marked on the heat shrinkable tube is greater than or equal to a preset font size, wherein a transmission characteristic value storing step of storing the frequency, the marking speed and the focal distance set in the temporary setting step in a separate storage space when the font size of the letter checked in the font size checking step is equal to or greater than the preset font size.

Before the heating step, a shrinkage checking step of checking shrinkage of the heat shrinkable tube; and a heating setting value readout step of reading out a heating time and a heating temperature value applied to the heat shrinkable tube from the separate storage space when the battery cell is manufactured based on the shrinkage checked in the shrinkage checking step may be performed.

The heating step may be performed based on the heating time and the heating temperature value read out in the heating setting value readout step.

The shrinkage of the heat shrinkable tube may be set differently depending on a size and a shape of the battery cell.

When the font size of the letter identified in the font size checking step is less than the preset font size, the marking step may be performed again by correcting the frequency, the marking speed, and the focal distance of the laser.

The preset font size may be set to a value of 6 points or more.

In accordance with another exemplary embodiment, provided is a transmission characteristic value determination method of laser marking a battery cell whose outer surface is formed of a heat shrinkable tube, the method including: a temporary setting step of setting a frequency, a marking speed, and a focal distance of a laser to a predetermined temporary setting value; marking one or more readout symbols composed of a predetermined number of lines on the heat shrinkable tube by transmitting the laser using a temporary setting value set in the temporary setting step; a heating step of applying heat to the heat shrinkable tube; and a readout symbol checking step of checking, after the heating step, whether the number of readout symbols marked on the heat shrinkable tube is identified as a predetermined number and the length of the line is not less than a predetermined preset length, wherein when the length of the line identified in the readout symbol checking step is not less than the preset length and the number of lines is identified as the predetermined number, a transmission characteristic value storing step of storing the frequency, the marking speed, and the focal distance set in the temporary setting step in a separate storage space is performed.

Before the heating step, a shrinkage checking step of checking shrinkage of the heat shrinkable tube; and a heating setting value readout step of reading out a heating time and a heating temperature value applied to the heat shrinkable tube from the separate storage space when the battery cell is manufactured based on the shrinkage checked in the shrinkage checking step may be performed.

The heating step may be performed based on the heating time and the heating temperature value read out in the heating setting value readout step.

The shrinkage of the heat shrinkable tube may be set differently depending on a size and shape of the battery cell.

When the length of the line identified in the readout symbol checking step is less than the predetermined length or when the number of lines is less than or greater than the predetermined number, the marking step may be performed again by correcting the frequency, the marking speed, and the focal distance of the laser.

In accordance with yet another exemplary embodiment, a battery cell includes: an electrode assembly including an anode, a cathode and a separator; an electrode assembly case for housing the electrode assembly; and an electrically insulating heat shrinkable tube for surrounding the outside of the electrode assembly case excluding a portion where the electrode terminal or the external input/output terminal is formed, and information of a corresponding cell is marked on the surface of the heat shrinkable tube.

The information marked on the surface of the heat shrinkable tube may be marked through a laser marking device.

The thickness of the heat shrinkable tube may be within 0.05 mm to 0.5 mm.

Advantageous Effects

In an embodiment of the present invention, in relation to the laser transmission characteristic value determination method, the proper transmission characteristic value of the laser is determined so that the letter of the battery cell may be written in a readable manner in the heat shrinkable tube and as the label configuration is deleted due to the information of the battery cell being written on the heat shrinkable tube with proper transmission characteristic value. Therefore, the incidental material cost due to the deleted label is reduced, thereby improving the economical efficiency.

BRIEF DESCRIPTION OF THE DRAWINGS

FIG. 1 is a structural view of a conventional battery cell;

FIG. 2 is a flowchart of a laser transmission characteristic value determination method according to an embodiment of the present invention;

FIG. 3 is a flowchart of a laser transmission characteristic value determination method according to another embodiment of the present invention; and FIG. 4 is a structural view of a battery cell according to an embodiment of the present invention.

MODE FOR CARRYING OUT THE INVENTION

Hereinafter, exemplary embodiments of the present invention will be described in more detail with reference to the contents described in the accompanying drawings. However, the present invention is not limited or restricted to exemplary embodiments. Only, the technical spirit of the present invention is disclosed to the full through the description of the embodiments, and it is provided to those skilled in the art that the present invention belongs to inform the scope of the present invention completely.

Although the terms "first," "second," etc., may be used herein to describe various elements, these elements should not be limited by these terms. The above terms are used only to distinguish one component from another. For example, an initial component may be referred to as a second component and vice versa without departing from the scope of the present invention. Terms used in this specification are used to describe specific embodiments, and are not intended to limit the scope of the present invention. The singular expressions include plural expressions unless the context clearly dictates otherwise.

Terms used in this specification may be currently widely used general terms in consideration of functions in the present invention but may vary according to the intents of those skilled in the art, precedents, or the advent of new technology. Additionally, in certain cases, there may be terms the applicant selects arbitrarily and in this case, their meanings are described in a corresponding description part of the present invention. Accordingly, terms used in the present invention should be defined based on the meaning of the term and the entire contents of the present invention instead of the simple term name.

Embodiment 1

Next, a laser transmission characteristic value determination method according to an embodiment of the present invention will be described.

The laser transmission characteristic value determination method according to an embodiment of the present invention marks the letter in a heat shrinkable tube with a laser with an optional transmission characteristic value set, and after applying the heat, checks the font size to adjust the transmission characteristic value to be the set font size. Therefore, it may increase the readability of the letter marked on the heat shrinkable tube so that the label configuration may be removed.

FIG. 2 is a flowchart of a laser transmission characteristic value determination method according to an embodiment of the present invention.

Referring to FIG. 2, in the laser transmission characteristic value determination method according to another embodiment of the present invention, the laser frequency, the marking speed, and the focal distance are set to predetermined temporary setting values to mark a battery pack whose appearance is formed of a heat shrinkable tube (temporary setting step: S110).

Then, the laser is transmitted with a value set to a predetermined temporary setting value to mark the letter on the heat shrinkable tube (marking step: S120), and apply heat (heating step: S130).

Then, it is checked whether the font size of the letter marked on the heat shrinkable tube is equal to or larger than the preset font size (font size checking step: S140). If the identified font size is greater than or equal to the preset font size, the transmission characteristic values of frequency, marking speed and focal distance for the size are stored in a separate storage space.

Each step of the laser transmission characteristic value determination method is described in more detail below.

The temporary setting step S110 is a step of setting the laser frequency, marking speed and focal distance to a predetermined temporary setting value. The focal length is a value at which the size of the font size is adjusted, and the frequency and marking speed are values mutually set to a value at which the font depth is adjusted.

Generally, the frequency is set to 20 to 100 kHz, the focal distance is set to 10 to 300 mm, and the marking speed is set to 50 mm/sec to 5000 mm/sec.

Also, the marking step S120 is a step of marking a letter in the heat shrinkable tube using the value set in the temporary setting step S110. More specifically, a letter is marked through a laser marking device set with a transmission characteristic value set to the predetermined temporary setting value. Here, letters may be marked on the heat shrinkable tube like the information recorded on the label during battery cell production, or only a part of the information may be marked thereon.

Also, the heating step S130 is a step of applying heat to the heat shrinkable tube, and the heat is applied according to the heating time and the heating temperature determined in the shrinkage checking step.

Also, as using heat shrinkable tubes with different shrinkages depending on the size of the battery cells, before the heating step S130, the shrinkage of the heat shrinkable tube is checked (shrinkage checking step), and based on the identified shrinkage, the heating time and the heating temperature value applied to the heat shrinkable tube are readout in a separate storage space when the battery cell is manufactured (heating setting value readout step).

The shrinkage checking step is a step of checking the shrinkage set in the heat shrinkable tube. The shrinkage checking step checks the set value according to the size and shape of each battery cell.

The heating setting value readout step is a step of reading out the heating time and the heating temperature value applied to the heat shrinkable tube in a separate storage space based on the shrinkage determined in the shrinkage checking step. It checks the value applied to the heat shrinkable tube when manufacturing the battery cell, and also checks the thickness of the heat shrinkable tube.

In general, the heating temperature is set to 70° C. or more and 120° C. or less, and the heating time is set in inverse proportion to the temperature. Also, shrinkage is generally from 50% to 80%, thickness is set from 0.05 mm to 0.5 mm, and heating temperature and heating time vary depending on shrinkage and thickness.

These values are verified to enable transmission characteristic values of the laser to be applied to various heat shrinkable tubes.

In addition, the heat shrinkable tube may be heated using a hot air fan, a heat gun, or the like.

This is because, if heat is directly applied to the heat shrinkable tube, soot is generated, thereby indirect heat is applied to prevent the readability of the marked letter in the marking step S120.

In addition, the font size checking step S140 is a step of checking whether the font size of the letter marked on the heat shrinkable tube is equal to or larger than a preset font size after the heating step S130. When manufacturing the battery cell, the heat shrinkable tube shrinks to the battery cell body, and the letter marked on the heat shrinkable tube is also reduced to check that the reduced letter is readable.

If the font size of the identified letter is greater than or equal to the preset font size, the transmission characteristic values of the frequency, marking speed and focal distance set in the temporary setting step S110 are stored. If the font size of the identified letter is less than the preset font size, the marking step S120 is performed again by correcting the frequency, the marking speed, and the focal distance. Here, the preset font size is set to a value of 6 points (2.1084 mm) or more.

Also, when the frequency, the marking speed and the focal length are corrected, first, the focal length is corrected so that the letter size may be increased and the frequency and marking speed are adjusted according to the focal distance.

For example, if the focal length is reduced to increase the letter, accordingly, it increases the energy of the laser and decreases the frequency or marking speed so that the tube does not penetrate during laser marking.

Embodiment 2

Next, a laser transmission characteristic value determination method according to another embodiment of the present invention will be described.

The laser transmission characteristic value determination method according to another embodiment of the present invention ensures accurate laser transmission characteristic values by marking a readout symbol formed with a predetermined number of lines in a shrinkable tube with a laser having an arbitrary transmission characteristic value set, and after applying the heat, by checking the number of lines of the readout symbol and adjusting the transmission characteristic value to identify the number of lines by a predetermined number.

FIG. 3 is a flowchart of a laser transmission characteristic value determination method according to another embodiment of the present invention.

Referring to FIG. 3, in the laser transmission characteristic value determination method according to another embodiment of the present invention, the laser frequency, the marking speed, and the focal distance are set to predetermined temporary setting values to mark a battery pack whose appearance is formed of a heat shrinkable tube (temporary setting step: S210).

Then, the laser is transmitted with a value set to a predetermined temporary set value and the heat shrinkable tube is marked with at least one readout symbol consisting of a predetermined number of lines (marking step S220), and heat is applied (heating step S230).

Then, it is checked whether or not the number of lines of the readout symbol marked on the heat shrinkable tube is identified as a predetermined number (font size checking step: S240). If the length of the identified line is greater than or equal to the predetermined length and the number of lines is identified as the predetermined number, the transmission characteristic values of frequency, marking speed and focal distance for the size are stored in a separate storage space.

Each step of the laser transmission characteristic value determination method is described in more detail below.

The temporary setting step S210 is a step of setting the laser frequency, marking speed and focal distance to a predetermined temporary setting value. The focal length is a value at which the size of the readout symbol is adjusted, and the frequency and marking speed are values mutually set to a value at which the depth of the readout symbol is adjusted.

Generally, the frequency is set to 20 to 100 kHz, the focal distance is set to 10 to 300 mm, and the marking speed is set to 50 mm/sec to 5000 mm/sec.

Also, the marking step S220 is a step of marking one or more readout symbols composed of a predetermined number of lines in the heat shrinkable tube using the value set in the temporary setting step S210. More specifically, the readout symbol is marked through the laser marking device set with the transmission characteristic value set to the predetermined temporary setting value. Here, the readout symbol has a plurality of horizontal or vertical lines in a predetermined range (the size of the font in which the information of the battery cell is written).

Also, the heating step S230 is a step of applying heat to the heat shrinkable tube, and the heat is applied according to the heating time and the heating temperature determined in the shrinkage checking step.

Also, as using heat shrinkable tubes with different shrinkages depending on the size of the battery cells, before the heating step S230, the shrinkage of the heat shrinkable tube is checked (shrinkage checking step), and based on the identified shrinkage, the heating time and the heating temperature value applied to the heat shrinkable tube are readout in a separate storage space when the battery cell is manufactured (heating setting value readout step).

The shrinkage checking step is a step of checking the shrinkage preset in the heat shrinkable tube. The shrinkage checking step checks the set value according to the size and shape of each battery cell.

The heating setting value readout step is a step of reading out the heating time and the heating temperature value applied to the heat shrinkable tube in a separate storage space based on the shrinkage determined in the shrinkage checking step. It checks the value applied to the heat shrinkable tube when manufacturing the battery cell, and also checks the thickness of the heat shrinkable tube.

In general, the heating temperature is set to 70° C. or more and 120° C. or less, and the heating time is set in inverse proportion to the temperature. Also, shrinkage is generally from 50% to 80%, thickness is set from 0.05 mm to 0.5 mm, and heating temperature and heating time vary depending on shrinkage and thickness.

These values are verified to enable transmission characteristic values of the laser to be applied to various heat shrinkable tubes.

In addition, the heat shrinkable tube may be heated using a hot air fan, a heat gun, or the like.

This is because, if heat is directly applied to the heat shrinkable tube, soot is generated, thereby indirect heat is applied to prevent the readability of the marked readout symbol in the marking step S220.

In addition, the readout symbol checking step S240 is a step of checking whether the number of readout symbols marked on the heat shrinkable tube is identified as a predetermined number after the heating step S230. When manufacturing a battery cell, the heat shrinkable tube shrinks to the battery cell body, and the letter marked on the heat shrinkable tube is also reduced together to check whether the reduced letter is identifiable through the readout symbol.

If the length of a line in the readout symbol is equal to or greater than a preset length and the number of lines is identified as a predetermined number, the frequency, marking speed, and focal length set in the temporary setting step S210 are stored in a separate storage space. If the number of identified lines is less than or greater than the predetermined number, the marking step S220 is performed again by correcting the frequency, the marking speed, and the focal distance. Here, the predetermined length of the preset line is set to 2.1 mm in one embodiment, but it is not limited thereto.

For example, if the length of the line identified in the readout symbol checking step S240 is 2.5 mm, since it is greater than the predetermined length, the number of lines is checked.

Also, if the length of the line identified in the readout symbol checking step S240 is 1.9 mm, since the focal length is less than the predetermined length value, the marking step S220 is performed again after the focal length is reduced.

Also, when the value of the laser frequency or the marking speed is large, the heat shrinkable tube is penetrated, and when the value of the laser frequency or the marking speed is small, it is difficult to identify and the correct number of lines is not derived.

For example, since the line length is 2.5 mm, in a case where the identified four lines are identified by checking the number of lines, if the number of markings in step S220 is four, the corresponding frequency and marking speed are correct. If the number of markings in the marking step (S220) is five, it is marked too deeply and is not correctly identified.

Thus, it re-performs the marking step S220 by decreasing the frequency and the marking speed.

Also, if the number of markings in the marking step S220 is three, according to the difficulty of clear identification due to the low depth of the marked line, the frequency and the marking speed are increased and the marking step S220 is performed again.

In addition, the readout symbol may be formed such that the direction of the line is horizontal and/or vertical. In addition, a letter is marked together and the laser transmission characteristic value may be determined by the determination method.

Embodiment 3

Next, a battery cell according to an embodiment of the present invention will be described.

The battery cell according to the embodiment of the present invention may be configured including only a heat shrinkable tube into which the information of the corresponding battery cell is inputted without the label on the case appearance where the electrode assembly is received, so that it reduces the cost of label production and shortens the process to enable rapid production.

FIG. 4 is a structural view of a battery cell according to an embodiment of the present invention.

Referring to FIG. 4, a battery cell 100 according to an embodiment of the present invention includes an electrode assembly 110 including an anode, a cathode, and a separator, an electrode assembly case 120 housing the electrode assembly, and an electrically insulating heat shrinkable tube 130 surrounding the outer periphery of the electrode assembly case excluding a portion where the electrode terminal or the external input/output terminal is formed. Here, FIG. 4 shows a cylindrical shape, but the shape is not limited thereto.

Further, each configuration of the battery cell will be described in more detail below.

The electrode assembly 110 includes a cathode, a cathode, and a separator. A positive electrode and a negative electrode, coated with an electrode active material, and a separator are stacked or wound in the order of an anode, a separator, and a cathode.

In addition, the electrode assembly case 120 has a configuration for housing the electrode assembly, and may be formed of metal and may be formed in a rectangular shape as well as a cylindrical shape.

Also, the heat shrinkable tube 130 has an electrically insulating configuration surrounding an outer circumference of the electrode assembly case except for a portion where the electrode terminal or the external input/output terminal is formed and may be configured to surround not only one battery cell but also two or more battery cells.

Also, the heat shrinkable tube 130 has different shrinkage depending on the size and shape of the battery cell.

Also, the information on the battery cell is written on the surface of the heat shrinkable tube 130, and is marked by a laser marking device.

Also, the thickness of the heat shrinkable tube 130 is within 0.05 mm to 0.5 mm, so that information written on the surface of the battery cell may be marked, and the entire thickness is not allowed to be too thick.

Through this, the battery cell may be produced quickly without any separate label configuration, and the cost of labeling is saved.

On the other hand, although the technical idea of the present invention is specifically described with reference to the above embodiments, it should be noted that the above embodiments are for the purpose of explanation and not for the purpose of limitation. It will be apparent to those skilled in the art that various modifications and variations may be made in the present invention without departing from the spirit and scope of the invention.

DESCRIPTION OF SYMBOLS

100: Battery cell
110: Electrode assembly
120: Electrode assembly case
130: Heat shrinkable tube

The invention claimed is:

1. A transmission characteristic value determination method of a laser marking a battery cell whose outer surface is formed of a heat shrinkable tube, the method comprising:
a temporary setting step of setting a frequency, a marking speed, and a focal distance of a laser to a predetermined temporary setting value;
performing a first marking of a letter on the heat shrinkable tube by transmitting the laser using a temporary setting value set in the temporary setting step; then
a heating step of applying heat to the heat shrinkable tube; then
a font size checking step of determining, after the heating step, a font size of the letter marked on the heat shrinkable tube; and then
performing a second marking of the letter on the heat shrinkable tube in response to the font size being less than a preset font size, wherein the second marking is performed with a corrected frequency, marking speed and focal length,
wherein a transmission characteristic value storing step of storing the frequency, the marking speed and the focal distance set in the temporary setting step in a separate storage space when the font size of the letter checked in the font size checking step is equal to or greater than the preset font size.

2. The method of claim 1, wherein before the heating step, a shrinkage checking step of checking shrinkage of the heat shrinkable tube; and
a heating setting value readout step of reading out a heating time and a heating temperature value applied to the heat shrinkable tube from the separate storage space when the battery cell is manufactured based on the shrinkage checked in the shrinkage checking step are performed.

3. The method of claim 2, wherein the heating step is performed based on the heating time and the heating temperature value read out in the heating setting value readout step.

4. The method of claim 2, wherein the shrinkage of the heat shrinkable tube is set differently depending on a size and a shape of the battery cell.

5. The method of claim 1, wherein the preset font size is set to a value of 6 points or more.

6. The method of claim 1, wherein during the heating step, a heating temperature is set between 70° C. and 120° C. and a shrinkage of the heat shrinkable tube is 50-80%.

7. The method of claim 1, wherein the heating step is performed using a heat gun or a fan.

8. A transmission characteristic value determination method of laser marking a battery cell whose outer surface is formed of a heat shrinkable tube, the method comprising:
a temporary setting step of setting a frequency, a marking speed, and a focal distance of a laser to a predetermined temporary setting value;
performing a first marking of one or more readout symbols composed of a predetermined number of lines on the heat shrinkable tube by transmitting the laser using a temporary setting value set in the temporary setting step; then
a heating step of applying heat to the heat shrinkable tube; and
a readout symbol checking step of checking, after the heating step, whether the number of readout symbols marked on the heat shrinkable tube is identified as a predetermined number and a length of the line is not less than a predetermined preset length; and then
performing a second marking of the letter on the heat shrinkable tube in response to the font size being less than a preset font size, wherein the second marking is performed with a corrected frequency, marking speed and focal length,
wherein when the length of the line identified in the readout symbol checking step is not less than the preset length and the number of lines is identified as the predetermined number, a transmission characteristic value storing step of storing the frequency, the marking speed, and the focal distance set in the temporary setting step in a separate storage space is performed.

9. The method of claim 8, wherein before the heating step, a shrinkage checking step of checking shrinkage of the heat shrinkable tube; and
a heating setting value readout step of reading out a heating time and a heating temperature value applied to the heat shrinkable tube from the separate storage space when the battery cell is manufactured based on the shrinkage checked in the shrinkage checking step are performed.

10. The method of claim 9, wherein the heating step is performed based on the heating time and the heating temperature value read out in the heating setting value readout step.

11. The method of claim 9, wherein the shrinkage of the heat shrinkable tube is set differently depending on a size and shape of the battery cell.

12. The method of claim 8, wherein when the length of the line identified in the readout symbol checking step is less than the predetermined length or when the number of lines is less than or greater than the predetermined number, the second marking step is performed.

13. The method of claim 8, wherein during the heating step, a heating temperature is set between 70° C. and 120° C. and a shrinkage of the heat shrinkable tube is 50% - 80%.

14. The method of claim 8, wherein the heating step is performed using a heat gun or a fan.

\* \* \* \* \*